Dec. 1, 1931.  P. KÄPPLER  1,834,624

BRAKE DEVICE OR COUPLING

Filed Dec. 22, 1927

Inventor
Paul Käppler
by
Attorney

Patented Dec. 1, 1931

1,834,624

UNITED STATES PATENT OFFICE

PAUL KÄPPLER, OF DRESDEN, GERMANY

BRAKE DEVICE OR COUPLING

Application filed December 22, 1927, Serial No. 241,764, and in Germany December 11, 1926.

This invention relates to a brake or coupling with interior bands, which, besides being of simple construction and ensuring reliable operation, is characterized by light weight.

The object of the invention is to provide a device which will operate as a coupling, or as a brake, or as a speed governor, for connecting or controlling the actions of two relatively rotating members.

According to this invention, brake-bands are attached to opposed eccentric levers, the pivots of the levers being fixed in such a position that according to whether the contrivance is to act as a coupling, a brake or a lock mechanism, a sufficient part of the tension $S_1$ at the one end is transmitted to the other end of the same brake band as preliminary tension $S_2$. According to the well-known brake law, $S_1 = S_2 \times e^{\mu\alpha}$, $S_1$ being the force exerted on the short lever-arm of the lever by the brakeband, whereas $S_2$ is the pressure exerted on the long lever-arm of the lever by the free end of the brake-band.

Further according to this invention, the levers at one side loosely rest on two pivots situated at two points diametrically opposed relative to the shaft, having freedom of motion in the opposite direction; the result is that in the one direction of rotation each lever will swing about one pivot, in the opposite direction the levers change their pivots. A further improvement is the fact that the levers are guided by (square or rectangular) guide pieces loosely fitted on the pivots and turning on them.

The accompanying drawings show some constructive forms of my invention, by way of example.

In all figures like numbers significate like parts.

Figure 1:
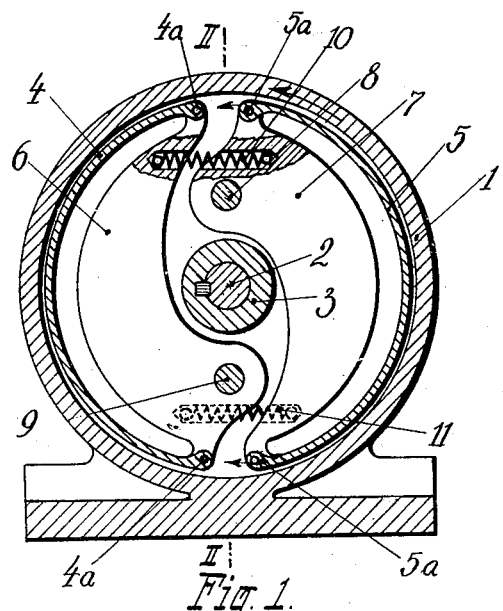
Fig. 1 is a section on the line 1—1 of Fig. 2, showing construction as a centrifugal brake.
Figure 2:
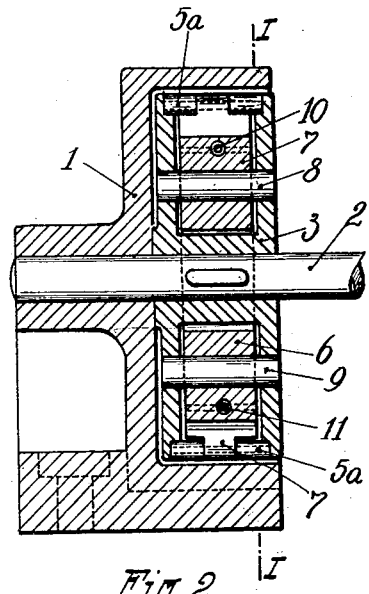
Fig. 2 is a section parallel to the shaft on the line 2—2 of Fig. 1.

In Figs. 1 and 2, the outer drum 1 of the brake is stationary. Keyed onto the shaft 2 is the main brake piece 3 carrying the opposed sector-shaped eccentric levers 6 and 7 pivoted at 8 and 9. By means of hinges 4a, 5a, the brake-bands are connected to the levers 6 and 7. Tension springs 10 and 11 draw the brakebands 4 and 5 back from the brake drum 1 when the brake is not in motion. According to the position of the pivots 8 and 9 in relation to the shaft 2, the extent of gripping action of the brake bands will be increased or lessened. Where the pivots 8 and 9 are very close to the shaft, the contrivance acts as a lock mechanism. The brake movement is introdwuced by the centrifugal force caused by the rotation of the levers 6 and 7 and the brake-bands 4 and 5. At which moment the brake begins to work, depends on the power of the springs 10 and 11. By varying the tension of these springs, it is possible to adjust the brake to start at any determined speed of rotation. Increase in speed will then put the brake in action.

Figure 3:
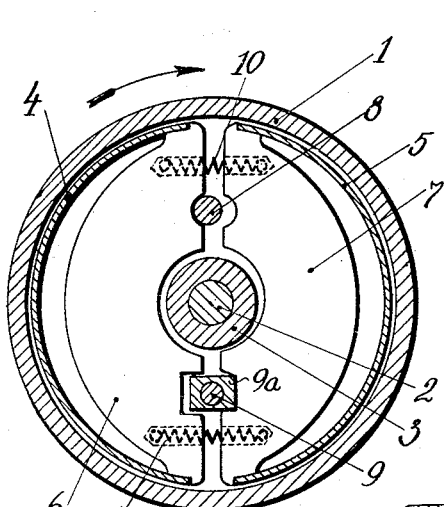
Fig. 3 shows a somewhat different constructive form, acting in both directions of rotation.

Fig. 3 shows a construction working in both directions, as each of the levers 6 and 7 may swing round either of the pivots according to the direction of rotation. At one side, the levers rest loosely and alternately on the pivots 8 and 9.

According to the direction of rotation (shown by arrow) and therefore also according to the (centrifugal) force acting on the levers 6 and 7 and the brake bands 4 and 5, the levers rest on the pivots 8 and 9 as shown in the drawings or in the opposite way. The levers 6 and 7 are supported on one side only. In order to guide their motion, the pivots 8 and 9 can, as shown in the lower half of Fig. 3 be fitted with guide pieces 9a, prismatical (square and rectangular) pieces fitting loosely and turning on pivots 8 and 9 if the latter are fixed in the main brake part 3.

Figure 4:
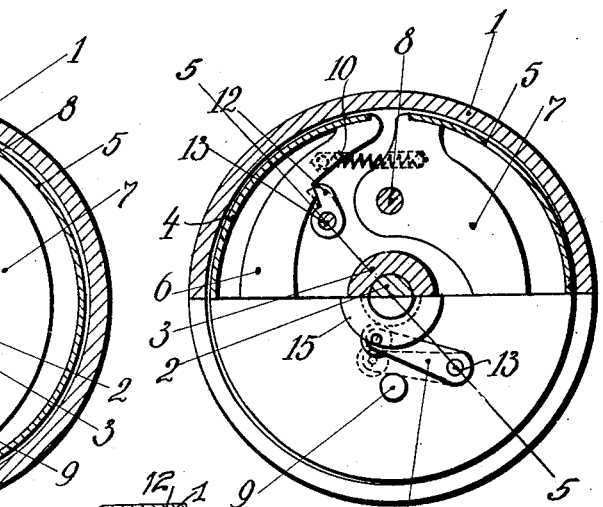
Fig. 4 is another constructive form showing how the principles of the invention (as shown in Figs. 1 and 2) may be adapted to a coupling. The upper half is drawn in section.
Figure 5:
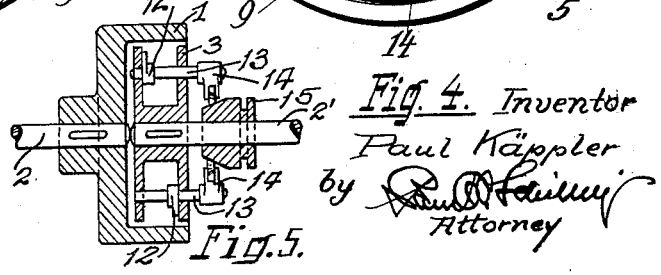
Fig. 5 is a section taken substantially on line 5—5 of Fig. 4.

Figs. 4 and 5 show one possible embodiment of my invention in a coupling in which members 1 and 3 are mounted on rotary shafts 2, 2' to be coupled. The two levers 6 and 7 carrying the brake bands 4 and 5 are, by means of catches 12 pressed against the drum 1. The catches 12 are fitted on pivots 13 which are placed in bearings in the main brake piece 3. Outside part 3, on the pivots 13, control levers 14 are fixed, these being operated in well-known manner by means of a conical collar 15 moved by control rods not shown in the drawings, and by the help of which the coupling may be engaged or disengaged. In the drawings, the collar 15 is represented by two semi-circles showing that the collar is conical and that it increases in diameter toward the beholder. In the position of the control lever shown by the dotted line, the catches 12 on the pivots 13 counteract the power of the springs 10 and 11. The levers 6 and 7 and the bands 4 and 5 would thus be closely pressed to the inner side of the drum 1, the motion of the drum 1 being thus transmitted to the main brake piece 3 or vice versa (coupling principle).

Having now described my invention, what I claim as new is:

1. In a device of the character described, a member having an annular friction surface, a second member rotatable with relation to the first member, a plurality of levers carried by said rotatable member and each pivoted adjacent one end eccentric to the axis of said rotatable member so as to provide a short arm and a long arm on opposite sides of its pivotal connection, and a friction band carried by each lever and respectively secured at its ends to the long and short arms of the lever, said bands being adapted for engagement, on an outward swinging movement of the levers, with the friction surface of the first-named member.

2. In a device of the character described, a member having an annular friction surface, a second member rotatable with relation to the first member, a plurality of levers carried by said rotatable member and each pivoted adjacent one end eccentric to the axis of said rotatable member so as to provide a short arm and a long arm on opposite sides of its pivotal connection, springs acting on the ends of said levers to hold the same normally retracted, and a friction band carried by each lever and respectively secured at its ends to the long and short arms of the lever, said bands being adapted for engagement, on an outward swinging movement of the levers with the friction surface of the first-named member.

3. In a device of the character described, a member having an annular friction surface, a second member rotatable with relation to the first member, a plurality of levers arranged on diametrically opposite sides of the axis of the rotatable member and pivotally mounted each at one end to the rotatable member eccentric to the axis thereof so as to provide a short arm and a long arm on opposite sides of its pivotal connection, the pivots of said levers being disposed at diametrically opposite sides of the axis of the rotatable member and at right angles to the sides first-named, and a friction band carried by each lever and respectively secured at its ends to the long and short arms of the lever, said bands being adapted for engagement, on an outward swinging movement of the levers, with the friction surface of the first-named member.

4. In a device of the character described, a member having an annular friction surface, a second member rotatable with relation to the first member, levers arranged on diametrically opposite sides of the axis of the rotatable member, each lever being reversed in arrangement with respect to the other and pivotally mounted each at one end to the rotatable member eccentric to the axis thereof so as to provide a short arm and a long arm on opposite sides of its pivotal connection, the pivots of said levers being disposed at diametrically opposite sides of the axis of the rotatable member and at right angles to the first-named sides of the rotatable member, springs between the dissimilar ends of said levers operating to hold the same normally retracted, and a friction band carried by each lever and respectively secured at its ends to the long and short arms of the lever, said bands being adapted for engagement, on an outward swinging movement of the levers, with the friction surface of the first-named member.

5. In a device of the character described, a member having an annular friction surface, a second member rotatable with respect to the first member, levers carried by said rotatable member and each pivoted adjacent one end eccentric to the axis of said rotatable member so as to provide a short arm and a long arm on opposite sides of its pivotal connection, springs between the ends of said levers operating to hold the same normally retracted, latches to engage and hold the levers projected, and a friction band carried by each lever and respectively secured at its ends to the long and short arms of the lever, said bands being adapted for engagement, on an outward swinging movement of the levers, with the friction surface of the first-named member.

6. In a device of the character described, two members, one of which at least is rotatable with relation to the other, one of said members having a friction surface, and the other of said members being provided with a plurality of friction bands for engagement with said friction surface, said elements being arranged at diametrically opposite sides of the axis of both members and pivoted to one of said members, the pivot of each friction element being situated at the sides of the aforesaid axis and at right angles to the sides of such axis occupied by the said elements.

7. In a device of the character described, two members, one of which at least is rotatable with relation to the other, one of said members having a friction surface, a plurality of levers carried by the other member, and friction bands extending between the ends of the levers and connected at their ends therewith, and adapted for engagement with said friction surface.

8. In a device of the character described, two members, one of which at least is rotatable with relation to the other, one of said members having a friction surface, pivot pins carried by the member having the friction surface and located on opposite sides of the axis of rotation, oppositely disposed levers pivotally engageable at their opposite ends with the pins, and brake bands extending between and connected at their ends to the ends of the levers, said bands being engageable with said friction surface.

9. In a device of the character described, two members, one of which at least is rotatable with relation to the other, one of said members having a friction surface, oppositely disposed levers, means for pivotally supporting the same eccentric to the axis of the members, so as to provide each lever with a short arm and a long arm, and a friction band extending from one arm to the other arm of each lever and connected at its ends therewith, said friction bands being engageable with said friction surface, and means for normally holding the levers retracted.

PAUL KÄPPLER.